(12) United States Patent
Han et al.

(10) Patent No.: US 7,327,378 B2
(45) Date of Patent: Feb. 5, 2008

(54) LASER SCANNING UNIT

(75) Inventors: Suk-gyun Han, Gyeonggi-do (KR);
Duk-soo Kim, Gyeonggi-do (KR);
Je-hwan You, Gyeonggi-do (KR)

(73) Assignee: Samsung Electronics Co., Ltd.,
Suwon-Si (KR)

( * ) Notice: Subject to any disclaimer, the term of this patent is extended or adjusted under 35 U.S.C. 154(b) by 284 days.

(21) Appl. No.: 10/750,894

(22) Filed: Jan. 5, 2004

(65) Prior Publication Data

US 2004/0207717 A1    Oct. 21, 2004

Related U.S. Application Data

(60) Provisional application No. 60/464,096, filed on Apr. 21, 2003.

(30) Foreign Application Priority Data

Apr. 21, 2003  (KR) ...................... 10-2003-0025081
May 24, 2003  (KR) ...................... 10-2003-0033246
Oct. 13, 2003  (KR) ...................... 10-2003-0070992

(51) Int. Cl.
*B41J 27/00*  (2006.01)
(52) U.S. Cl. ...................... 347/243; 347/260
(58) Field of Classification Search ................ 347/231, 347/243, 259–261, 237, 247; 318/141, 779
See application file for complete search history.

(56) References Cited

U.S. PATENT DOCUMENTS 5,430,362 A * 7/1995 Carr et al. .................. 318/779
6,043,835 A   3/2000 AuYeung et al. ........... 347/247
6,118,238 A * 9/2000 Munro et al. ............... 318/141

FOREIGN PATENT DOCUMENTS

| CN | 2382034 | 6/2000 |
| JP | 3-223876 | 10/1991 |
| JP | 5-110772 | 4/1993 |
| JP | 8-211317 | 8/1996 |
| JP | 08211317 A * | 8/1996 |
| JP | 9-26553 | 1/1997 |
| JP | 09-222578 | 8/1997 |
| JP | 10-161050 | 6/1998 |
| JP | 11-245442 | 9/1999 |
| JP | 2002-116394 | 4/2002 |
| JP | 2002116394 A * | 4/2002 |
| KR | 2002-0033922 | 5/2002 |

* cited by examiner

*Primary Examiner*—Hai Pham
(74) *Attorney, Agent, or Firm*—Staas & Halsey LLP

(57) ABSTRACT

A laser scanning unit includes a housing; an optical system disposed in the housing and including an optical source which emits a laser beam, a polygonal mirror which scans the laser beam, and a plurality of optical elements which image the laser beam on an image surface; a motor disposed in the housing and which rotates the polygonal mirror; and a motor drive chip disposed outside of the housing and which uses a sensorless algorithm to control a rotation speed of the motor.

45 Claims, 8 Drawing Sheets

LASER SCANNING UNIT

CROSS-REFERENCE TO RELATED APPLICATIONS

This application claims the priority of Korean Patent Application Nos. 2003-33246, filed on May 24, 2003, 2003-25081, filed on Apr. 21, 2003, and 2003-70992, filed on Oct. 13, 2003 in the Koran Intellectual Property Office and U.S. Provisional Patent Application No. 60/464,096 filed on Apr. 21, 2003, the disclosures of which are incorporated herein in their entirety by reference.

BACKGROUND OF THE INVENTION

1. Field of the Invention

The present invention relates to a laser scanning unit for an image forming and/or reproducing apparatus, and more particularly, to a laser scanning unit in which a motor drive chip for a polygonal mirror motor is installed outside of a housing.

2. Description of the Related Art

Laser scanning units are employed in a printing machines such as, for example, laser printers. A conventional laser scanning unit includes: a laser source; a movable mirror; and a lens system. Generally, the laser source emits laser beams which are directed by the mirror and the lens system to a surface of a charged photoconductive medium, such as a photoconductive drum or a photoconductive belt. The lens system compensates for any image distortion caused by, for example, the varying distance between the mirror and points along the photosensitive drum or belt. The laser beam changes the charge of portions of the photoconductive medium on which it is incident forming a latent image on the photoconductive medium which corresponds to the image to be printed and to which toner may adhere.

FIG. 1 is an exploded view illustrating the internal configuration of a conventional laser scanning unit.

Referring to FIG. 1, the conventional laser scanning unit includes various optical elements. The optical elements include a laser diode (LD) 11 emitting a laser beam, a collimating lens 12 collimating a laser beam emitted from the LD 11 so that the laser beam is parallel to or lined up with an optical axis, a polygonal mirror 14 horizontally moving a laser beam which has passed through the collimating lens 12 at a constant linear speed, a cylindrical lens 13 imaging a laser beam on a surface of the polygonal mirror 14 in a horizontally linear shape, Fθ lenses 15 having a refractive index with respect to the optical axis which lenses polarize a laser beam reflected by the polygonal mirror 14 at a constant speed to a main scanning direction and correcting aberration to focus the laser beam on a scanned surface, an image-forming mirror 16 reflecting a laser beam which has passed through the Fθ lenses 15 and imaging the laser beam in the form of dots on a surface of a photoconductive drum 60 of a printing machine, an optical sensor 18 receiving a laser beam and providing a horizontal synchronization, and a synchronization signal detecting mirror 17 reflecting a laser beam to the synchronization signal detecting optical sensor 18. Such optical elements are, as illustrated, often installed inside a housing 50 and sealed so as not to be contaminated by foreign substances, such as dust or toner.

A motor 20 rotating the polygonal mirror 14 at a constant speed is installed on a circuit board 30 within the housing 50. A motor drive chip 40 formed of a semiconductor integrated circuit is mounted on the circuit board 30 to drive and control the motor 20. A circuit board 10 controlling the LD 11 is disposed inside the housing 50.

FIG. 2 is a block diagram illustrating the circuit configuration of the motor drive chip of the conventional laser scanning unit of FIG. 1.

Referring to FIG. 2, the motor 20 rotating the polygonal mirror 14 at a constant speed includes three position sensors 21, 22, and 23, and a speed sensor 24. In general, hall sensors are used as the sensors 21, 22, 23, and 24. The motor drive chip 40 includes a position signal amplifying section 41, a speed signal amplifying and filtering section 42, a speed control section 43, a commutation control section 44, and a three-phase inverter 45. The sensors 21, 22, and 23 are each connected to the position signal amplifying section 41 of the motor drive chip 40 by two signal lines. The speed sensor 24 is connected to the speed signal amplifying and filtering section 42 by two signal lines. The three-phase inverter 45 is respectively connected to terminals u, v, and w of the motor 20 (shown in FIG. 1) by three power supply lines.

The position signal amplifying section 41 amplifies position signals Sa, Sb, and Sc of a rotor of the motor 20 (shown in FIG. 1) respectively received from the position sensors 21, 22 and 23 and transmits the amplified signals to the commutation control section 44. The speed signal amplifying and filtering section 42 amplifies and filters a speed signal Sd received from the speed sensor 24 and transmits the amplified and filtered signal to the speed control section 43. The speed control section 43 calculates a control signal to control the rotation speed of the motor 20 in response to the received speed signal and transmits the control signal to the commutation control section 44. The commutation control section 44 controls the three-phase inverter 45 in response to the received position signal and the speed control signal. The inverter 45 respectively supplies current in a proper switching order to the terminals u, v, and w of the motor 20 so that the motor 20 rotates at a constant speed.

In the conventional laser scanning unit described above, the motor drive chip 40 is disposed inside the housing 50. Further, the motor drive chip 40 acts as a heat-source during operation. As a result, during operation, the temperature inside the laser scanning unit increases due to heat generated by the motor drive chip 40. Properties of the LD 11 and the Fθ lens 15 are temperature sensitive. Consequently, the temperature increase inside the laser scanning unit affects properties of the LD 11 and the Fθ lens 15.

Tables 1 and 2 present measurement results of internal temperature changes and temperature changes in each element in the conventional laser scanning unit. Table 1 shows temperature changes (in ° C.) in each element of the laser scanning unit over time when a motor is continuously driven at 22,000 rpm under low temperature/humidity conditions. Table 2 shows temperature changes (in ° C.) in each element in the laser scanning unit over time when a motor is continuously driven at 22,000 rpm under high temperature/humidity conditions.

TABLE 1

| Time (Min.) | External temperature (° C.) | LSU Internal temperature | Surface temperature of drive chip | Bottom temperature of motor | Surface temperature of Fθ lens | Surface temperature of collimating lens | Surface temperature of LD case |
|---|---|---|---|---|---|---|---|
| 0 | 23.9 | 33.6 | 42.4 | 40.0 | 28.5 | 30.5 | 30.5 |
| 10 | 24.0 | 34.1 | 43.6 | 40.3 | 28.7 | 30.6 | 31.0 |
| 20 | 24.3 | 44.9 | 57.1 | 50.2 | 37.4 | 43.5 | 45.6 |
| 30 | 24.0 | 50.4 | 55.6 | 56.1 | 42.4 | 49.4 | 51.4 |
| 40 | 25.3 | 54.3 | 58.1 | 60.2 | 45.8 | 53.2 | 55.1 |
| 50 | 23.9 | 57.6 | 62.0 | 62.8 | 48.6 | 56.5 | 58.5 |
| 60 | 23.9 | 60.2 | 64.1 | 65.2 | 51.8 | 59.3 | 61.3 |
| 70 | 24.0 | 61.4 | 65.2 | 66.3 | 53.0 | 60.3 | 61.6 |
| 80 | 23.9 | 61.2 | 64.7 | 66.5 | 52.8 | 60.2 | 62.0 |
| 90 | 24.5 | 60.9 | 64.9 | 66.1 | 52.8 | 60.1 | 62.0 |
| 100 | 24.4 | 60.8 | 64.3 | 66.1 | 53.2 | 60.0 | 61.6 |
| 110 | 24.0 | 61.2 | 64.8 | 66.2 | 53.3 | 60.3 | 62.3 |
| 120 | 24.1 | 61.7 | 65.3 | 66.8 | 53.9 | 60.8 | 62.7 |
| 130 | 24.2 | 62.8 | 66.5 | 67.5 | 54.7 | 61.8 | 63.7 |
| 140 | 24.2 | 62.6 | 66.1 | 67.7 | 55.4 | 61.7 | 63.3 |

TABLE 2

| Time (Min.) | External temperature (° C.) | LSU Internal temperature | Surface temperature of drive chip | Surface temperature of motor | Surface temperature of Fθ lens | Surface temperature of collimating lens | Surface temperature of LD case |
|---|---|---|---|---|---|---|---|
| 0 | 32.1 | 50.3 | 49.0 | 48.2 | 50.2 | 49.1 | 50.0 |
| 10 | 32.2 | 50.1 | 60.6 | 48.1 | 49.4 | 48.4 | 49.4 |
| 20 | 32.6 | 59.7 | 73.8 | 61.5 | 53.7 | 57.6 | 59.9 |
| 30 | 33.6 | 64.5 | 78.9 | 67.9 | 58.5 | 62.9 | 65.1 |
| 40 | 33.2 | 67.8 | 77.4 | 70.6 | 61.6 | 66.2 | 67.6 |
| 50 | 33.6 | 68.9 | 83.4 | 72.4 | 63.8 | 67.8 | 69.9 |
| 60 | 33.2 | 69.8 | 84.5 | 73.3 | 65.1 | 68.9 | 71.0 |
| 70 | 34.5 | 70.3 | 84.8 | 73.5 | 65.7 | 69.4 | 71.4 |
| 80 | 33.5 | 70.3 | 85.0 | 73.8 | 65.9 | 69.5 | 71.6 |
| 90 | 33.3 | 70.6 | 79.8 | 72.6 | 65.5 | 69.0 | 69.7 |

It can be seen from Tables 1 and 2 that the internal temperature increase in the laser scanning unit is slightly affected by the environment in which the laser scanning unit is used as well as conditions of use of the laser scanning unit. However, as the external temperature increases, the temperature of each element of the laser scanning unit also increases. Further, as a drive time becomes longer, the degree of temperature increase in each element increases. In particular, the surface temperature of the motor drive chip exhibits the largest increase, and the surface temperature of the polygonal mirror motor exhibits the second largest increase. Therefore, it is shown that the greatest cause of the internal temperature increase of the laser scanning unit is the motor drive chip.

The internal temperature increase of the laser scanning unit due to heat generated by the motor drive chip leads to the temperature increase of the laser diode. Consequently, the temperature characteristic of the laser diode changes and, as a result, the optical power of the laser diode cannot be controlled with precision.

Further, the internal temperature increase of the laser scanning unit causes the temperature of the Fθ lens to increase. The temperature increase of the Fθ lens, which is typically injection molded plastic, affects the refractive index and curvature of each region in the Fθ lens. As a result, variation of the diameter of the optical spot formed on a surface of the photoconductive medium increases.

Table 3 presents measurement results of diameters of an optical spot with changes in the temperature inside the laser scanning unit. Positions of the optical spot, that is, 0,−100, and 100 mm, represent the center of a scanning line and distances from the center to both ends of the scanning line, respectively, and −2 mm~+2 mm represents changes in the length of the Fθ lens with temperature changes. "Main" and "sub" represent diameters of a main scanning direction and a sub scanning direction of the optical spot, respectively.

TABLE 3

| LSU Internal temperature | Position of optical spot | −2 mm main (μm) | −2 mm sub (μm) | −1 mm main (μm) | −1 mm sub (μm) | 0 mm main (μm) | 0 mm sub (μm) | +1 mm main (μm) | +1 mm sub (μm) | +2 mm main (μm) | +2 mm sub (μm) | Optical power |
|---|---|---|---|---|---|---|---|---|---|---|---|---|
| 24.5° C. | −100 | 73 | 79 | 72 | 79 | 74 | 79 | 87 | 83 | 115 | 86 | 0.192 |
|  | 0 | 69 | 76 | 70 | 77 | 71 | 77 | 74 | 81 | 80 | 84 | 0.390 |
|  | 100 | 70 | 71 | 72 | 73 | 78 | 77 | 87 | 83 | 123 | 99 | 0.219 |
| 35.0° C. | −100 | 72 | 81 | 77 | 81 | 81 | 81 | 102 | 83 | 126 | 86 | 0.225 |
|  | 0 | 70 | 77 | 71 | 77 | 74 | 78 | 79 | 81 | 90 | 83 | 0.245 |
|  | 100 | 73 | 73 | 72 | 75 | 80 | 78 | 96 | 84 | 134 | 94 | 0.190 |
| 45.0° C. | −100 | 77 | 84 | 83 | 83 | 96 | 82 | 125 | 86 | 140 | 90 | 0.219 |
|  | 0 | 70 | 75 | 72 | 77 | 76 | 77 | 86 | 80 | 102 | 83 | 0.241 |
|  | 100 | 74 | 71 | 81 | 74 | 105 | 76 | 126 | 84 | 143 | 93 | 0.192 |
| 55.0° C. | −100 | 74 | 79 | 80 | 79 | 100 | 79 | 130 | 81 | 144 | 83 | 0.223 |
|  | 0 | 73 | 76 | 77 | 76 | 89 | 76 | 118 | 78 | 132 | 81 | 0.239 |
|  | 100 | 77 | 71 | 86 | 72 | 115 | 75 | 140 | 79 | 147 | 83 | 0.181 |
| 65.0° C. | −100 | 78 | 76 | 93 | 74 | 114 | 76 | 147 | 84 | 186 | 89 | 0.192 |
|  | 0 | 79 | 81 | 89 | 78 | 114 | 78 | 131 | 78 | 140 | 81 | 0.239 |
|  | 100 | 65 | 77 | 92 | 82 | 126 | 79 | 144 | 85 | 157 | 93 | 0.214 |

It can be seen from Table 3 that as the temperature of the Fθ lens increases, the diameters, in scanning direction and the sub scanning direction, of the optical spots formed on the surface of the photoconductive medium increase by 30~40 μm or more. As the diameter of th optical spot formed on the surface of the photoconductive medium and the diameter variation increase, the resolution and uniformity of an image decrease.

One approach to addressing the above-described disadvantages is to dispose the motor drive chip 40 outside of the housing 50 so that the motor drive chip 40 is isolated from the LD 11 and the Fθ lenses 15. However, locating the motor drive chip 40 outside of the housing exposes the signal and power supply lines to outside interference. As shown in FIG. 2, a plurality of signal lines which respectively connect the motor drive chip 40 to the sensors 21, 22, 23, and 24 included in the motor 20 and the power supply lines which supply electric power to the motor 20 are exposed outside the housing 50. Thus, disadvantageously, severe noise is generated due to an] by electromagnetic fields outside the housing 50. Further, the position and speed sensors are typically low voltage sensors such as, for example, hall sensors which output sine wave signals of approximately ±0.1~0.2V. Since the sensor output voltage is low, the output signals are very sensitive to noise, and accordingly, in the conventional art, the motor drive chip 40 needs to be positioned as close as possible to the position and speed sensors 21, 22, 23, and 24.

SUMMARY OF THE INVENTION

The present invention provides a laser scanning unit in which a motor drive chip for a polygonal mirror motor is disposed outside of a housing to eliminate the effects of increased temperature caused by the motor drive chip so as to obtain a stable optical power from a laser diode, and a motor is controlled using a sensorless control algorithm to minimize noise.

Additional and/or other aspects and advantages of the invention will be set forth in part in the description which follows and, in part, will be obvious from the description, or may be learned by practice of the invention.

According to an aspect of the present invention, there is provided a laser scanning unit including: a housing; an optical system disposed in the housing and including an optical source which emits a laser beam, a mirror which scans the laser beam, and a plurality of optical elements which image the laser beam on an image surface; a motor disposed in the housing and which rotates the mirror; and a motor drive chip disposed outside of the housing and which controls a rotation speed of the motor.

The motor drive chip may be mounted on a main printed circuit board of a printing machine with which the laser scanning unit is used.

The motor drive chip may be electrically connected to the motor by a cable, and the cable may be a flexible printed circuit board.

The motor drive chip may control the motor via a sensorless control algorithm using back-electromotive forces generated by the motor, and the motor drive chip and the motor may be connected by power supply and back-electromotive signal lines.

The motor drive chip may include: a motor starting section which generates a motor starting signal to start the motor; an inverter which applies current to the motor in response to the motor starting signal; a back-electromotive force detecting section which detects back-electromotive forces generated rotation of the motor; a speed control section which detects the position of a rotor of the motor and the speed of the motor based on waveforms of the back-electromotive forces detected by the back-electromotive force detecting section to generate a speed control signal; and a commutation control section which controls the inverter in response to the speed control signal.

The motor drive chip may rotate the motor at a constant speed via a sensorless control algorithm using current supplied to the motor, the inductance of the motor, a third harmonic voltage of a stator of the motor, or electromagnetic flux generated between the stator and the rotor of the motor.

According to another aspect of the present invention, there is provided a laser scanning unit including: a housing; an optical source which emits a laser beam; a mirror which scans the laser beam; a plurality of optical elements which image the laser beam onto an image surface; a motor which rotates the mirror; and a motor drive chip which controls a rotation speed of the motor. The optical source, the mirror, the plurality of optical elements, and the motor are disposed in the housing, and the motor drive chip is disposed outside of the housing.

According to still another aspect of the present invention, there is provided a laser scanning unit including: an optical system disposed in an enclosure and including an optical source which emits a laser beam, a mirror which scans the laser beam, and a plurality of optical elements which image the laser beam onto an image surface; a motor disposed in the enclosure and which rotates the mirror; and a motor drive chip disposed outside of the enclosure and which controls a rotation speed of the motor.

According to yet another aspect of the present invention, there is provided a laser scanning unit including: an enclosure enclosing an optical source which emits a laser beam, a mirror which scans the laser beam, a plurality of optical elements which image the laser beam on an image surface, and a motor disposed in the enclosure and which rotates the polygonal mirror; and a motor drive chip disposed outside of the enclosure and which controls a rotation speed of the motor.

According to a further aspect of the present invention, there is provided a method of improving imaging resolution and uniformity of a laser scanning unit, the method includes: enclosing an optical source which emits a laser beam, a mirror which scans the laser beam, a plurality of optical elements which image the laser beam on an image surface, and a motor and which rotates the mirror; and controlling the motor via a motor drive chip disposed outside of the enclosure using a sensorless control algorithm.

According to yet a further embodiment of the present invention, there is provided a method of moderating a temperature characteristic of a laser diode, the method including: enclosing an optical source which emits a laser beam, a mirror which scans the laser beam, a plurality of optical elements which image the laser beam on an image surface, and a motor and which rotates the mirror; and controlling the motor via a motor drive chip disposed outside of the enclosure using a sensorless control algorithm.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
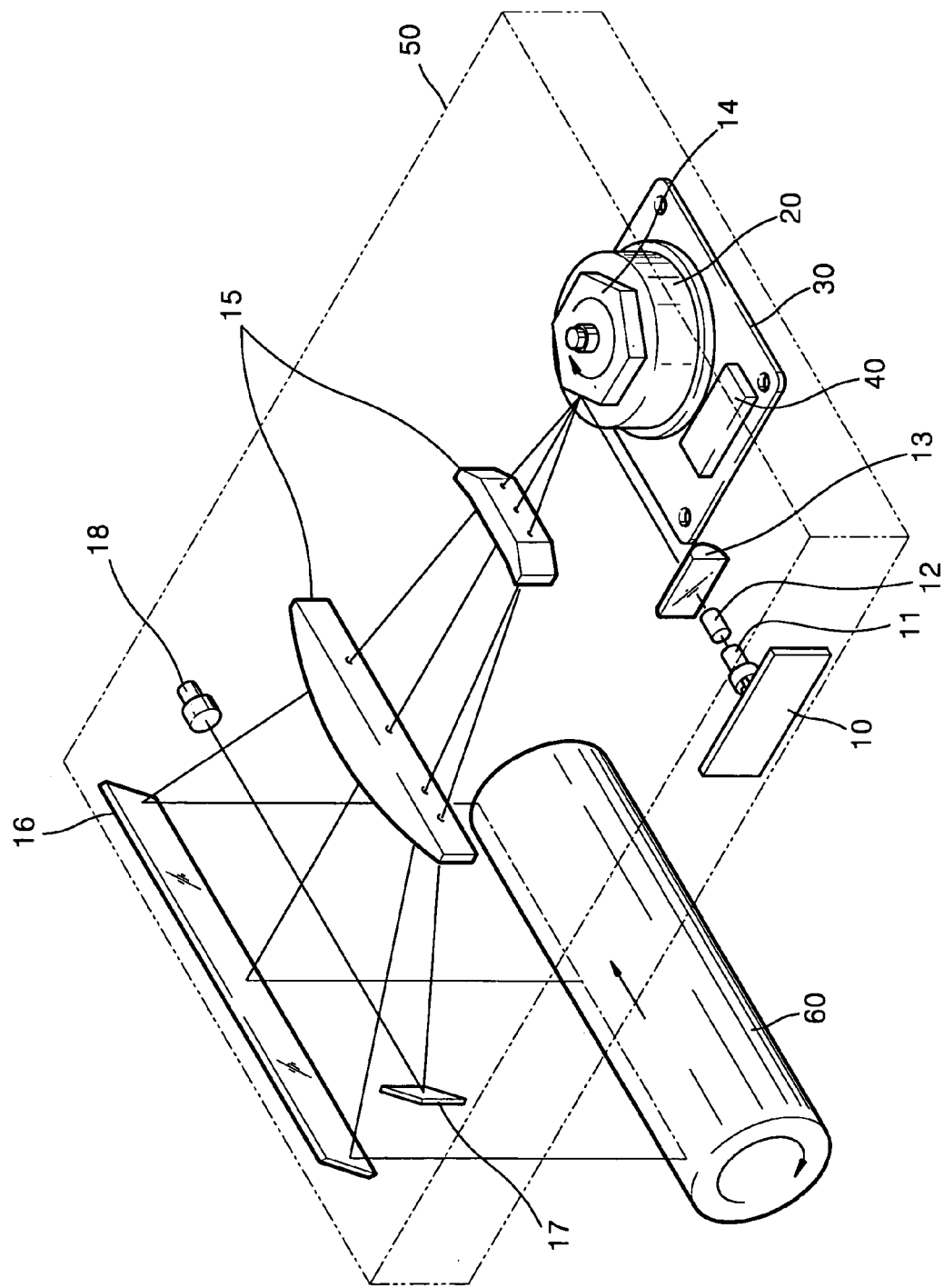
FIG. 1 is a perspective view illustrating an internal configuration of a conventional laser scanning unit.
Figure 2:
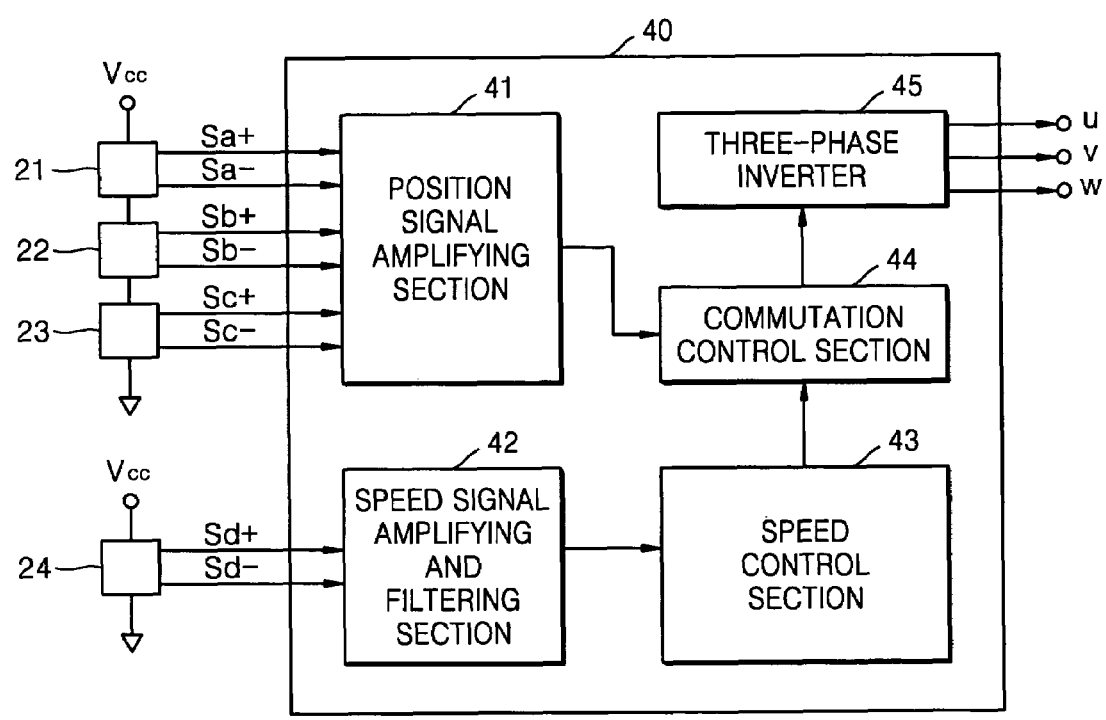
FIG. 2 is a block diagram illustrating a circuit configuration of a motor drive chip of the conventional laser scanning unit of FIG. 1.

Reference will now be made in detail to embodiments of the present invention, examples of which are illustrated in the accompanying drawings, wherein like reference numerals refer to the like elements throughout. The embodiments are described below to explain the present invention by referring to the figures.

Figure 3:
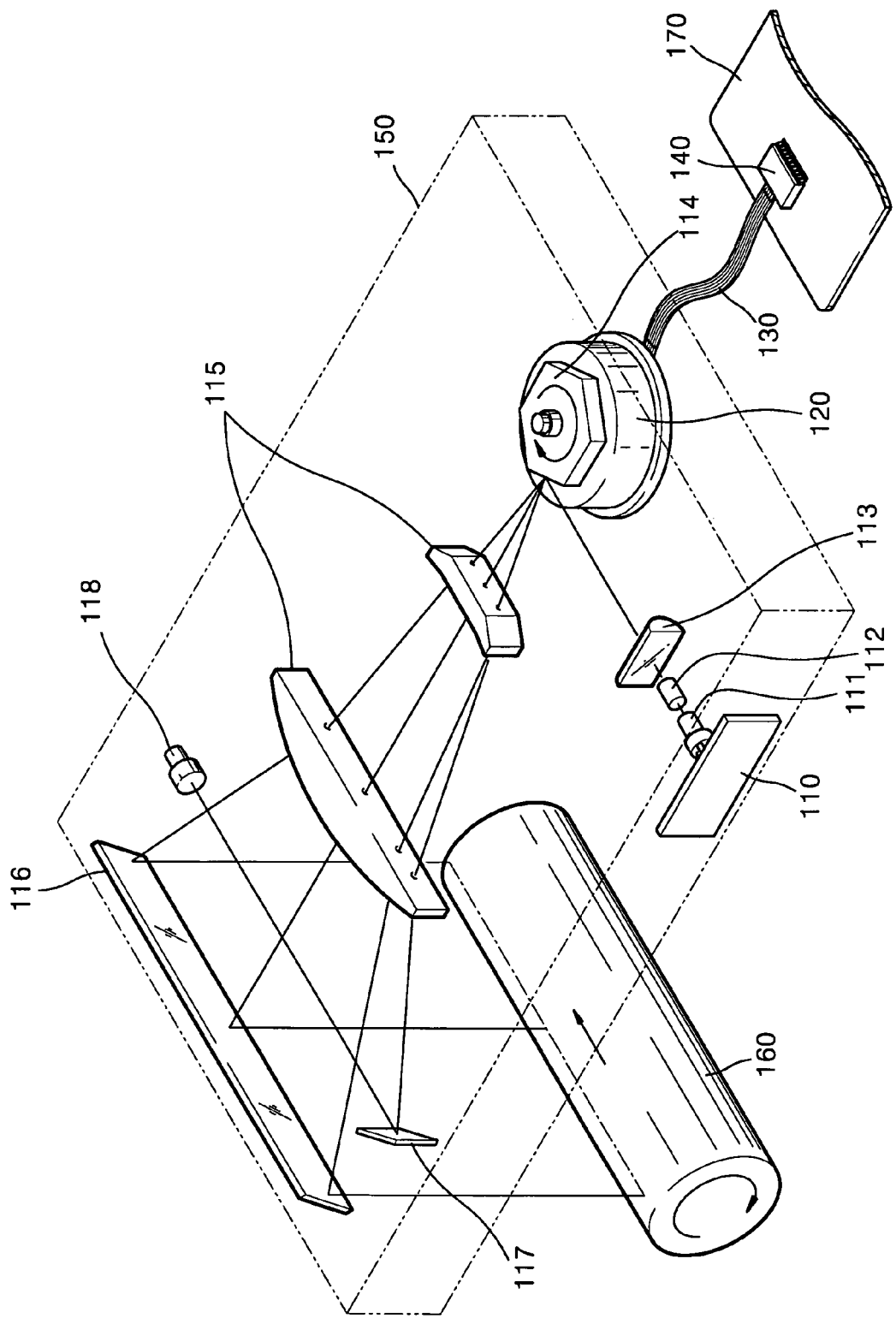
FIG. 3 is a perspective view illustrating the overall configuration of a laser scanning unit according to a first embodiment of the present invention.

FIG. 3 is a perspective view illustrating the overall configuration of a laser scanning unit according to an embodiment of the present invention.

Referring to FIG. 3, the laser scanning unit includes a housing 150 having a internal space, and an optical system disposed inside the housing 150 and including a plurality of optical elements.

The housing 150 supports the optical elements of the optical system and encloses the optical elements so that contamination of the optical elements by foreign substances, such as dust particles or toner, is prevented. To this end, the housing is sealable.

The optical system includes an optical source emitting a laser beam, a mirror 114 scanning the laser beam, and a plurality of optical elements, such as lenses and mirrors, which image the laser beam on an image surface. While a polygonal mirror is described herein, it is to be understood that other configurations are possible. As the optical source, for example, a laser diode 111 may be used. However, it is to be understood that while a laser diode is illustrated in FIG. 3 and described hereafter, other optical sources may be used. The laser diode 111 is controlled by an optical source control circuit (not shown) mounted on a circuit board 110. A collimating lens 112 and a cylindrical lens 113 are disposed along the optical path of the laser beam emitted from the laser diode 111. The collimating lens 112 collimates a laser beam emitted from the laser diode 111 so that the laser beam is parallel to or convergent on an optical axis, and the cylindrical lens 113 projects the laser beam on a surface of the polygonal mirror 114 in a horizontally linear shape. The polygonal mirror 114 horizontally moves a laser beam that has passed through the collimating lens 112 and the cylindrical lens 113 horizontally at a constant linear speed. Fθ lenses 115 are disposed in front of the polygonal mirror 114 along the optical path of the laser beam after the polygonal mirror 114. The Fθ lenses 115 have a refractive index with respect to the optical axis so as to polarize a beam of a constant speed reflected by the polygonal mirror 114 in a main scanning direction and to correct any aberration to focus the beam on an imaging surface. A laser beam having passed through the Fθ lenses 115 is reflected by an image-forming mirror 116 disposed along the optical path of the laser beam after the Fθ lenses 115 so as to be imaged in form of dots on a surface of a photoconductive medium such as, for example, a photoconductive drum 160, which is an image surface of a printing machine. However, it is to be understood that while a photoconductive drum is illustrated in FIG. 3 and described hereafter, other photoconductive media may be used. A synchronization signal detecting mirror 117 and an optical sensor 118 are interposed between the Fθ lenses 115 and the image-forming mirror 116 to receive at least a portion of a laser beam and provide horizontal synchronization.

The laser scanning unit according to the first embodiment of the present invention includes a motor 120 rotating the polygonal mirror 114 and a motor drive chip 140 driving the motor 120 to rotate the motor at a constant speed.

Various kinds of motors may serve as the motor 120 including, for example, a three-phase brushless DC (BLDC) motor. The motor 120 is mounted inside the housing 150. Since a separate circuit board does not need to be used for the motor 120, which will be explained in detail below, the motor 120 is directly mountable to the housing 150.

The motor drive chip 140 is formed of a semiconductor integrated circuit including a plurality of circuits driving and controlling the motor 120. According to the first embodiment of the present invention, the motor 120 is disposed inside the housing 150 while the motor drive chip 140 is disposed outside the housing 150. By way of a non-limiting example, the motor drive chip 140 is mountable on a main printed circuit board 170 of the printing machine with which the laser scanning unit according to the first embodiment of the present invention is used. However, it is to be understood that the motor drive chip 140 is mountable in other manners. When the motor drive chip 140 is mounted to the main circuit board 170, the motor drive chip 140 is electrically connectable to the motor 120 via a cable such as, by way of a non-limiting example, a flexible printed circuit board (FPCB) 130 as shown in FIG. 3.

According to the first embodiment of the present invention, since the motor drive chip 140 is disposed outside the housing 150, the effect of an increase in temperature inside the housing 150 due to heat generated by the motor drive chip 140 is eliminated, and accordingly a stable optical power is obtainable from the laser diode 111. An increase in the temperature of the Fθ lenses 115 due to heat generated by the motor drive chip 140 is also prevented, such that the diameter of the optical spot formed on the surface of the photoconductive drum 160 and the diameter variation decrease, thereby improving the resolution and uniformity of an image.

According to the first embodiment of the present invention, when the motor drive chip 140 is outside of the housing, in order to reduce noise due to external electronic waves, the number of signal lines connecting the motor drive chip 140 to the motor 120 is minimized. To this end, the motor drive chip 140 drives the motor 120 so as to rotate it at a constant speed using a sensorless control algorithm. By employing the sensorless control algorithm the motor 120 does not need to be provided with a conventional position sensor and a speed sensor. As a result, signal lines connecting the sensors to the motor drive chip 140 are not required.

According to the first embodiment of the present invention, the number of signal lines connecting the motor 120 disposed inside the housing 150 to the motor drive chip 140 disposed outside the housing 150 is reduced, thereby minimizing noise. Furthermore, the laser scanning unit according to the first embodiment of the present invention does not employ a position sensor and a speed sensor, such that a separate circuit board for the motor 120 is not required, thereby reducing the manufacturing costs.

Various sensorless control algorithms that are usable to control the rotation speed of the motor 120 will be explained below with reference to FIGS. 4 through 9.

Figure 4:
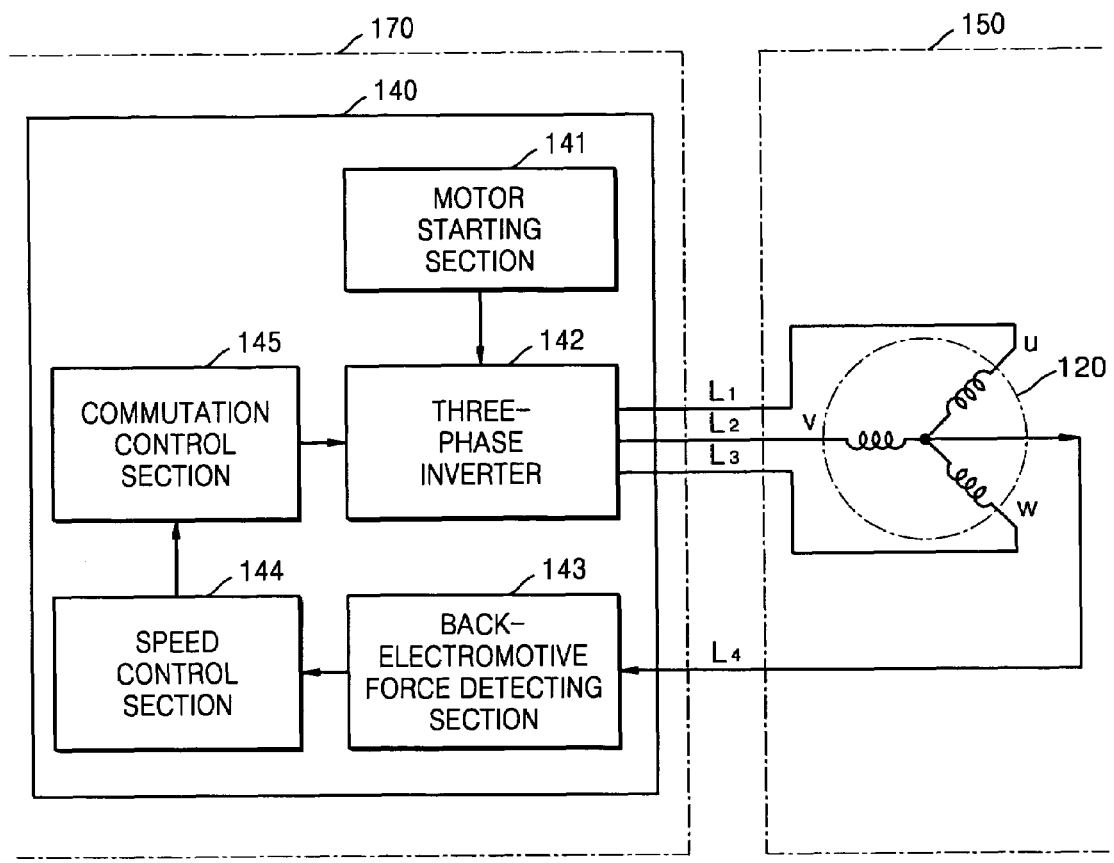
FIG. 4 is a diagram of a block diagram illustrating a circuit configuration of a motor driven by a motor drive chip according to the first embodiment of the present invention.
Figure 5:
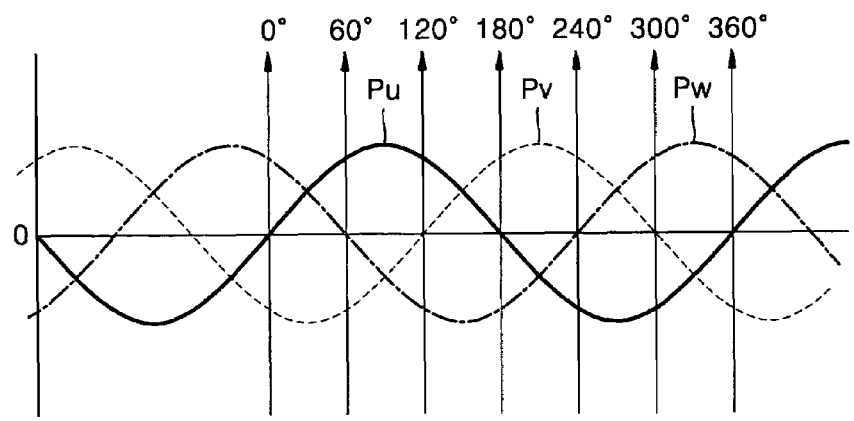
FIG. 5 is a diagram illustrating waveforms of back-electromotive forces detected by a back-electromotive force detection circuit of the motor drive chip of FIG. 4.

FIG. 4 is a block diagram illustrating a circuit configuration of a motor drive chip for explaining a sensorless control algorithm using back-electromotive forces generated by a motor controlled by a motor drive chip according to the first embodiment of the present invention. FIG. 5 is a diagram illustrating waveforms of back-electromotive forces detected by a back-electromotive force detection circuit of the motor drive chip of FIG. 4.

Referring to FIG. 4, the motor drive chip 140 mounted on the main printed circuit board 170 of the printing machine includes a motor starting section 141, a three-phase inverter 142, a back-electromotive force detecting section 143, a speed control section 144, and a commutation control section 145. The three-phase inverter 142 is respectively connected to terminals u, v, and w of the motor 120 by three power supply lines $L_1$, $L_2$, and $L_3$, respectively. The back-electromotive force detecting section 143 is connected to the motor 120 by one back-electromotive force signal line $L_4$.

The motor starting section 141 generates a motor starting signal to start the motor 120, and the inverter 142 applies current to the motor 120 in response to the motor starting signal to start the motor 120. As the motor 120 is rotating, back-electromotive forces are generated. The generated back-electromotive forces are detected by the back-electromotive force detecting section 143. At this time, as shown in FIG. 5, waveforms of back-electromotive forces Pu, Pv, and Pw in respective phases u, v, and w detected by the back-electromotive force detecting section 143 have a phase difference of 120° therebetween. The speed control section 144 respectively senses zero-crossing points of the waveforms of the back-electromotive forces Pu, Pv, and Pw to identify the position of a rotor of the motor 120, and determines the rotation speed of the motor 120 based on amplitude and time intervals between respective phases to output an appropriate speed control signal. The output speed control signal is transmitted to the commutation control section 145. The commutation control section 145 controls the inverter 145 in response to the received speed control signal. The inverter 145 accordingly supplies current in a proper switching order to the terminals u, v, and w, respectively, of the motor 120 to rotate the rotor of the motor 120 at a constant speed.

As previously explained, according to the first embodiment of the present invention, the motor drive chip 140 is connected to the motor 120 installed inside the housing 150 by the three power supply lines $L_1$, $L_2$, and $L_3$ and the back-electromotive force signal line $L_4$. Therefore, the number of signal lines is reduced as compared with the conventional art, thereby minimizing noise generated by external electromagnetic waves.

Figure 6:
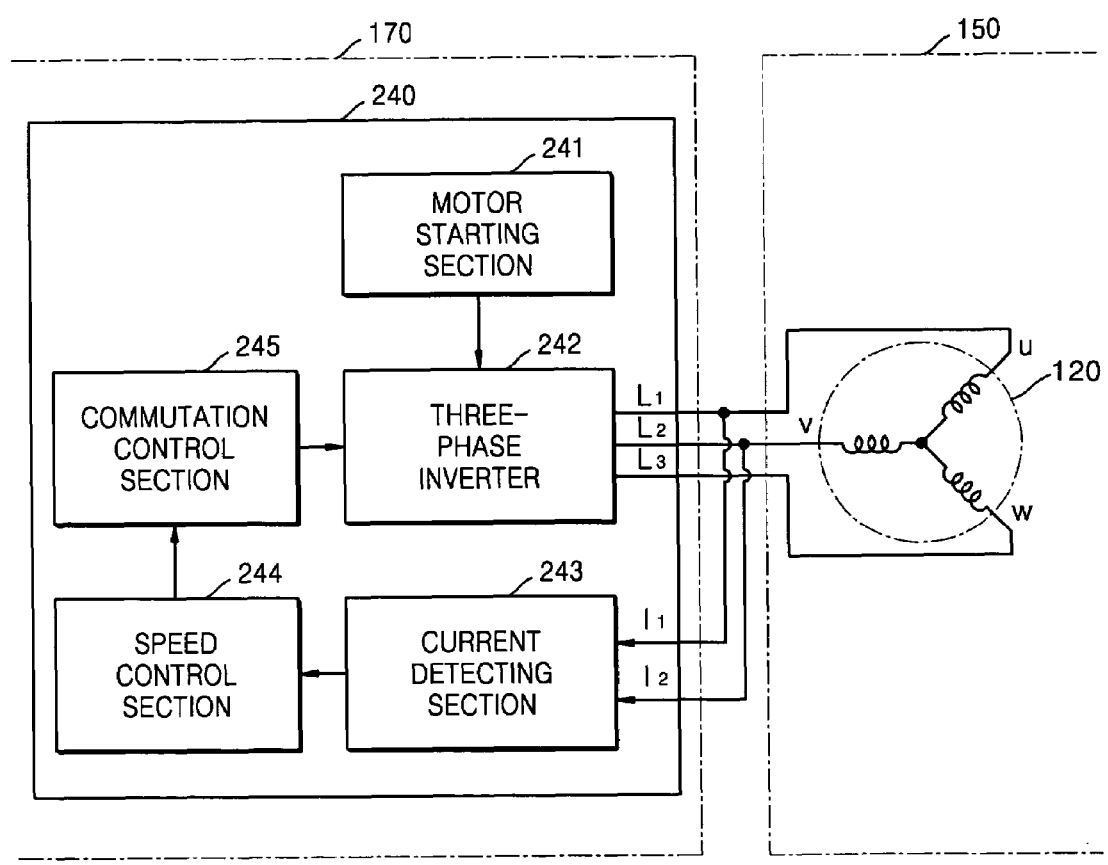
FIG. 6 is a block diagram illustrating a circuit configuration of a motor drive chip to drive a motor via a sensorless control algorithm using current supplied to the motor according to a second embodiment of the present invention.

FIG. 6 is a block diagram illustrating a circuit configuration of a motor drive chip to drive a motor via a sensorless control algorithm using current supplied to the motor according to a second embodiment of the present invention.

Referring to FIG. 6, a motor drive chip 240 mounted on a main printed circuit board 170 of a printing machine includes a motor starting section 241, a three-phase inverter 242, a current detecting section 243, a speed control section 244, and a commutation control section 245.

The motor starting section 241 generates a motor starting signal to start the motor 120. The three-phase inverter 242 applies current to the motor 120 according to the motor starting signal to start the motor 120. The current detecting section 243 detects current flowing through three power supply lines $L_1$, $L_2$, and $L_3$ respectively connected between terminals u, v, and w of the motor 120 and the three-phase inverter 242 using a current sensor or shunt resistance. Since waveforms of the current respectively supplied to the terminals u, v, and w of the motor 120 are obtainable using two current signals, the current detecting section 243 is respectively connected to the two power supply lines $L_1$ and $L_2$ by two current signal lines $I_1$ and $I_2$. However, while $I_1$ and $I_2$ are shown as being connected to $L_1$ and $L_2$, $I_1$ and $I_2$ need only be connected to any two of $L_1$, $L_2$, and $L_3$.

Current signals detected by the current detecting section 243 are sine wave signals. Accordingly, the speed control portion 244 identifies the position of the rotor of the motor 120 in the same manner as in the previous embodiment using the back-electromotive forces (i.e., sensing zero-crossing points of waveforms of the current signals), and thus outputs an appropriate speed control signal. The commutation control section 245 controls the three-phase inverter 242 according to the received speed control signal. The three-phase inverter 242 accordingly supplies current to the terminals u, v, and w of the motor 120, respectively, in a proper switching order so that the motor 120 rotates at a constant speed.

Figure 7:
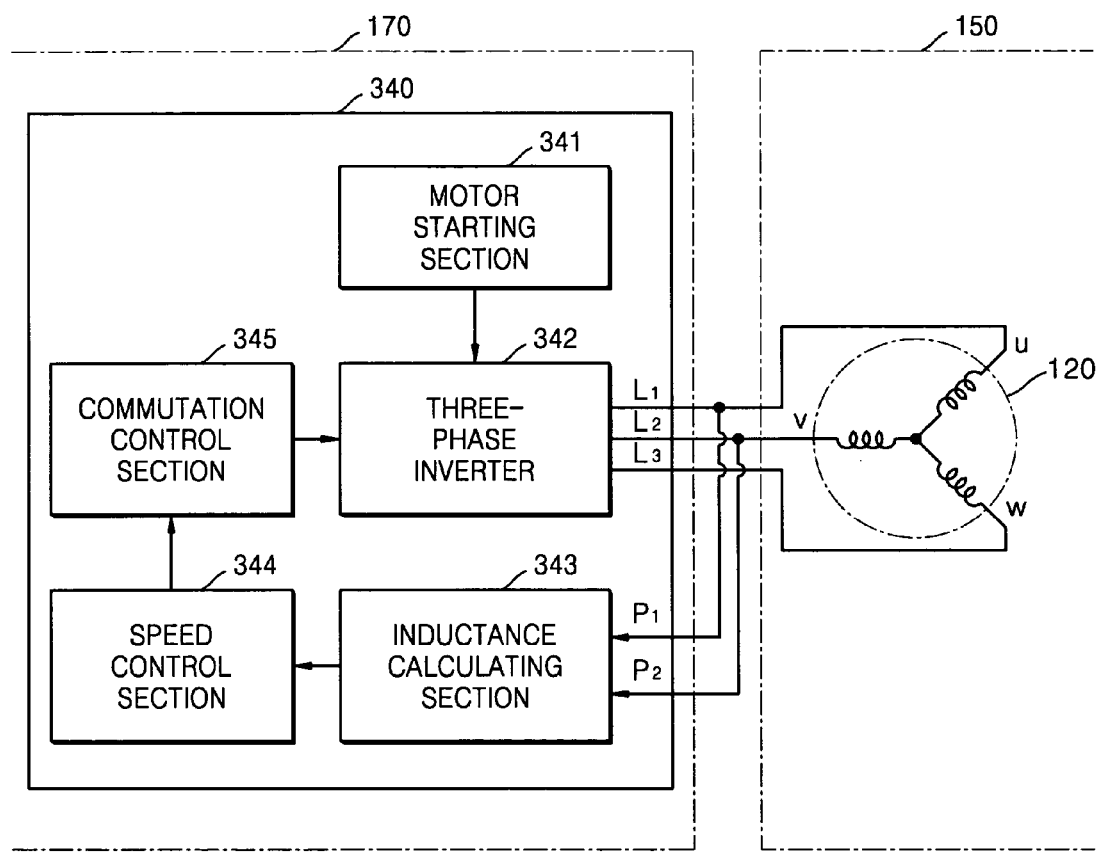
FIG. 7 is a block diagram illustrating a circuit configuration of a motor drive chip to drive a motor via a sensorless control algorithm using the inductance of the motor according to a third embodiment of the present invention.

FIG. 7 is a block diagram illustrating a circuit configuration of a motor drive chip to drive a motor via a sensorless control algorithm using the inductance of the motor according to a third embodiment of the present invention.

Referring to FIG. 7, a motor drive chip 340 mounted on a main printed circuit board 170 of a printing machine includes a motor starting section 341, a three-phase inverter 342, an inductance calculating section 343, a speed control section 344, and a commutation control section 345.

Functions of the motor starting section 341, the three-phase inverter 342, and the commutation control section 345 are the same as those described above, and thus a detailed description thereof is omitted.

The inductance calculating section 343 detects current and voltage flowing through three power supply lines $L_1$, $L_2$, and $L_3$ respectively connected between terminals u, v, and w of the motor 120 and the three-phase inverter 342. Here, for the same reasons as described above (i.e., the waveforms of current and voltage supplied to terminals u, v, and w are obtainable using two current or voltage signals), the inductance calculating section 343 is respectively connected to the two power supply lines $L_1$ and $L_2$ by two current and voltage signal lines $P_1$ and $P_2$. However, while $P_1$ and $P_2$ are shown as being connected to $L_1$ and $L_2$, $P_1$ and $P_2$ need only be connected to any two of $L_1$, $L_2$, and $L_3$.

The voltage of the motor 120 is expressable as the following function of the inductance and the current of the motor 120:

$$V=L(\theta) \times dI/dt.$$

Inductance $L(\theta)$, which is a function of the position $\theta$ of magnetic flux, is calculable using the current and voltage detected by the inductance calculating section 343. The speed control section 344 detects the position of the rotor of the motor 120 from waveforms of the obtained inductance, and thus outputs an appropriate speed control signal.

Figure 8:
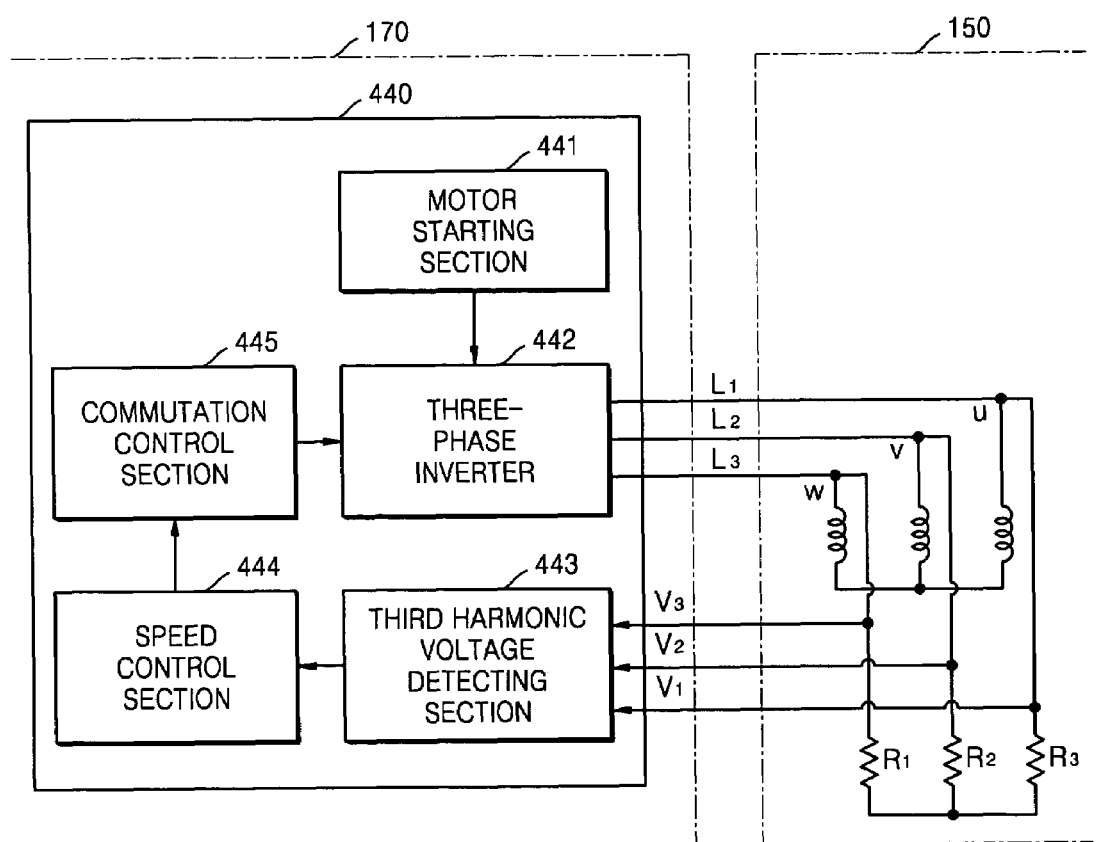
FIG. 8 is a block diagram illustrating a circuit configuration of a motor drive chip to drive a motor via a sensorless control algorithm using a third harmonic voltage of a stator of the motor according to a fourth embodiment of the present invention.

FIG. 8 is a block diagram illustrating a circuit configuration of a motor drive chip to drive a motor via a sensorless control algorithm using a third harmonic voltage of the motor according to a fourth embodiment of the present invention.

Referring to FIG. 8, a motor drive chip 440 mounted on a main printed circuit board 170 of a printing machine includes a motor starting section 441, a three-phase inverter 442, a third harmonic voltage detecting section 443, a speed control section 444 and a commutation control section 445.

Functions of the motor starting section 441, the three-phase inverter 442, and the commutation control section 445 are the same as those described above, and thus a detailed description thereof is omitted.

The third harmonic voltage detecting section 443 detects voltage applied to three power supply lines $L_1$, $L_2$, and $L_3$ respectively connected between terminals u, v, and w of the motor 120 and the three-phase inverter 442. For this detection, the third harmonic voltage detecting section 443 is respectively connected to the three power supply lines $L_1$, $L_2$, and $L_3$ by three voltage signal lines $V_1$, $V_2$, and $V_3$.

While the motor 120 is rotating, a third harmonic voltage of the stator of the motor 120 has a position component. The third harmonic voltage detecting section 443 detects a voltage of the stator in the motor 120 of a Y-connection and sums up all the voltages. The sum of the voltages has a third harmonic voltage component. The speed control section 444 recognizes the position of the rotor of the motor 120 using waveforms of the third harmonic voltage with the position component, and thus outputs an appropriate speed control signal.

Figure 9:
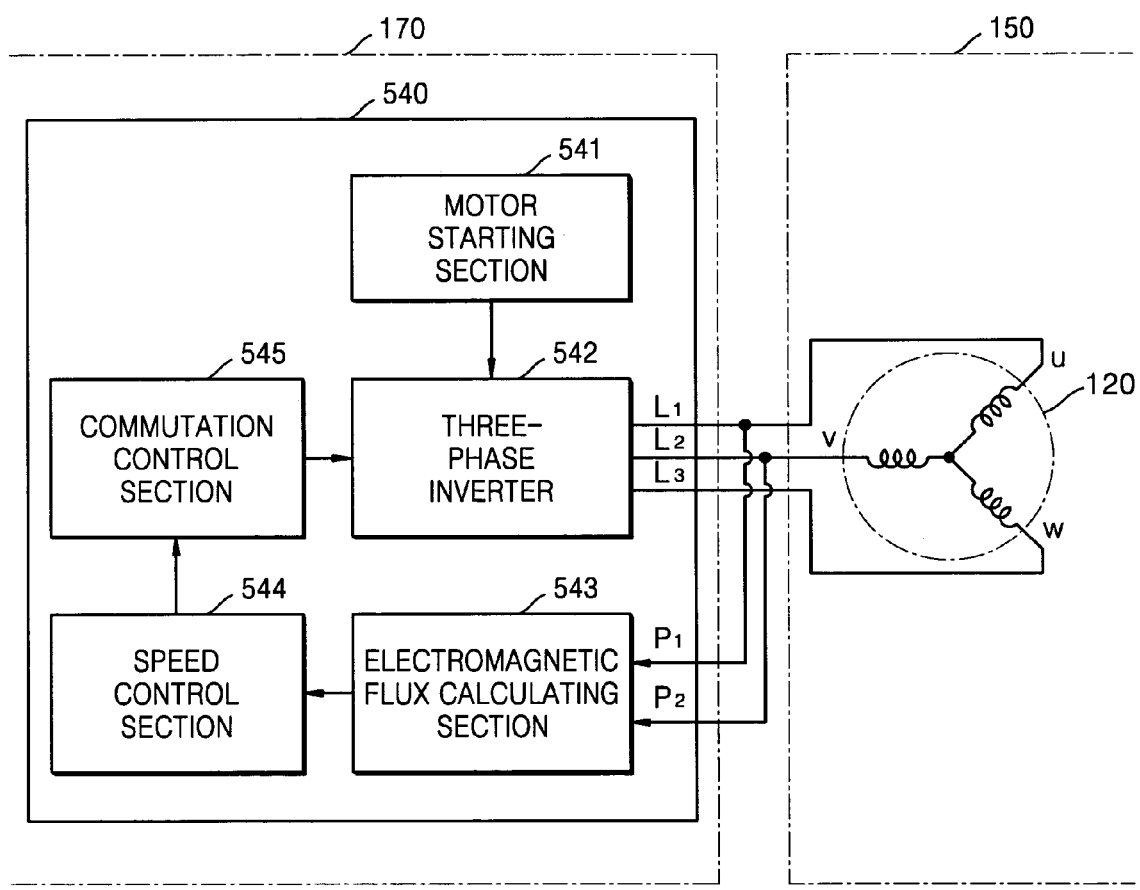
FIG. 9 is a block diagram illustrating a circuit configuration of a motor drive chip to drive a motor via a sensorless control algorithm using an electromagnetic flux according to a fifth embodiment of the present invention.

FIG. 9 is a block diagram illustrating a circuit configuration of a motor drive chip to drive a motor via a sensorless control algorithm using an electromagnetic flux according to a fifth embodiment of the present invention.

Referring to FIG. 9, a motor drive chip 540 mounted on a main printed circuit board 170 of a printing machine includes a motor starting section 541, a three-phase inverter 542, an electromagnetic flux calculating section 543, a speed control section 544, and a commutation control section 545.

Functions of the motor starting section 541, the three-phase inverter 542, and the commutation control section 545 are the same as those described above, and thus a detailed description thereof is omitted.

The electromagnetic flux calculating section 543 detects current and voltage flowing through three power supply lines $L_1$, $L_2$, and $L_3$ respectively connected between terminals u, v, and w of the motor 120 and the three-phase inverter 542. Here, for the same reasons as described above (i.e., the waveforms of current and voltage supplied to terminals u, v, and w are obtainable using two current or voltage signals), the electromagnetic flux calculating section 543 is respectively connected to the two power supply lines $L_1$ and $L_2$ by two current and voltage signal lines $P_1$ and $P_2$. However, while $P_1$ and $P_2$ are shown as being connected to $L_1$ and $L_2$, $P_1$ and $P_2$ need only be connected to any two of $L_1$, $L_2$, and $L_3$.

When electric power is respectively supplied to the terminals u, v, and w of the motor 120 to rotate the motor 120, electromagnetic flux is generated between a coil which is the stator of the motor 120 and a magnet which is the rotor of the motor 120. The electromagnetic flux is calculable by an indirect method using the current and voltage detected by the electromagnetic flux calculating section 543. The speed control section 544 detects the position of the rotor of the motor 120 from waveforms of the calculated electromagnetic flux, and accordingly, outputs an appropriate speed control signal.

As described above, the described embodiments of the present invention have an advantage in that the motor drive chip for the polygonal mirror motor is disposed outside the housing, and thus, an increase in the temperature inside the housing due to heat generated by the motor drive chip is prevented. Accordingly, a stable optical power is obtained from the laser diode. Also, since the diameter of the optical spot formed on the image-forming surface and the diameter variation decrease, the resolution and uniformity of an image are improved.

The described embodiments of the present invention have another advantage in that the motor is controlled using a sensorless control algorithm, and thus, the number of signal lines connecting the motor drive chip to the motor is reduced, thereby minimizing noise.

The described embodiments of the present invention have still another advantage in that a plurality of sensors which are used in the conventional laser scanning unit are not required in the laser scanning unit according to the present invention, and accordingly, manufacturing costs are reduced.

Although a few embodiments of the present invention have been shown and described, the present invention is not limited to the described embodiments. Rather, it would be appreciated by those skilled in the art that changes may be made in this embodiment without departing from the principles and spirit of the invention, the scope of which is defined by the claims and their equivalents.

What is claimed is:

1. A laser scanning unit comprising:
    a housing;
    an optical system disposed in the housing and including an optical source which emits a laser beam, a mirror which scans the laser beam, and a plurality of optical elements which image the laser beam on an image surface;
    a motor disposed in the housing and which rotates the mirror; and
    a motor drive chip disposed outside of the housing and which uses a sensorless algorithm to control a rotation speed of the motor,
    wherein the motor drive chip is mounted on a main printed circuit board of a printing machine with which the laser scanning unit is used, the main printed circuit board being disposed remotely from the laser scanning unit.

2. The laser scanning unit of claim 1, wherein the motor drive chip is electrically connected to the motor by a cable.

3. The laser scanning unit of claim 2, wherein the cable is a flexible printed circuit board.

4. The laser scanning unit of claim 1, wherein the motor is a three-phase brushless DC motor.

5. The laser scanning unit of claim 1, wherein the sensorless control algorithm uses back-electromotive forces generated by the motor.

6. The laser scanning unit of claim 5, wherein the motor drive chip and the motor are connected by power supply and back-electromotive force signal lines.

7. The laser scanning unit of claim 5, wherein the motor drive chip includes:
    a motor starting section which generates a motor starting signal to start the motor;
    an inverter which applies current to the motor in response to the motor starting signal;
    a back-electromotive force detecting section which detects back-electromotive forces generated by rotation of the motor;
    a speed control section which detects a position of a rotor of the motor and a speed of the motor based on waveforms of the back-electromotive forces detected by the back-electromotive force detecting section to generate a speed control signal; and
    a commutation control section which controls the inverter in response to the speed control signal.

8. The laser scanning unit of claim 7, wherein the inverter is a three-phase inverter having three terminals, three power supply lines connect the three terminals to the motor drive chip, and one electromagnetic force line connects the back-electromagnetic force detecting section to the motor.

9. The laser scanning unit of claim 7, wherein the back-electromotive force detecting section detects waveforms of back-electromotive forces and the back-electromotive forces have respective phase differences of 120°.

10. The laser scanning unit of claim 9, wherein the speed control section respectively senses zero-crossing points of the waveforms of the back-electromotive forces so as to identify the position of the rotor, and determines a rotation speed of the rotor based on amplitude and time intervals between respective phases to output the speed control signal to the commutation control section.

11. The laser scanning unit of claim 10, wherein the commutation control section controls the inverter in response to the speed control signal so as to cause the inverter to respectively supply current to the terminals of the motor in a switching order so as to rotate the rotor at a constant speed.

12. The laser scanning unit of claim 1, wherein the sensorless control algorithm uses a current supplied to the motor.

13. The laser scanning unit of claim 12, wherein the motor drive chip includes:
    a motor starting section which generates a motor starting signal to start the motor;
    an inverter which applies current to the motor in response to the motor starting signal;
    a current detecting section which detects current supplied to the motor;
    a speed control section which detects a position of a rotor of the motor and a speed of the motor based on waveforms of the current detected by the current detecting section to generate a speed control signal; and
    a commutation control section which controls the inverter in response to the speed control signal.

14. The laser scanning unit of claim 13, wherein the motor drive chip and the motor are connected by power supply and current signal lines.

15. The laser scanning unit of claim 14, wherein the inverter is a three-phase inverter having three terminals, three power supply lines connect the three terminals to the motor drive chip, and two current signal lines connect the current detecting section to two of the three power supply lines.

16. The laser scanning unit of claim 15, wherein the current detecting section detects current signals of power supplied by the two of the three power supply lines.

17. The laser scanning unit of claim 16, wherein the current signals are sine wave signals.

18. The laser scanning unit of claim 17, wherein the current signals have respective phase differences of 120°.

19. The laser scanning unit of claim 18, wherein the speed control section respectively senses zero-crossing points of the current signals so as to identify the position of the rotor, and determines a rotation speed of the rotor based on amplitude and time intervals between respective phases to output the speed control signal to the commutation control section.

20. The laser scanning unit of claim 19, wherein the commutation control section controls the inverter in response to the speed control signal so as to cause the inverter to respectively supply current to the terminals of the motor in a switching order so as to rotate the rotor at a constant speed.

21. The laser scanning unit of claim 1, wherein the sensorless control algorithm uses an inductance of the motor.

22. The laser scanning unit of claim 21, wherein the motor drive chip includes:
a motor starting section which generate a motor starting signal to start the motor;
an inverter which applies current to the motor in response to the motor starting signal;
an inductance calculating section which detects current and voltage supplied to the motor to calculate the inductance of the motor;
a speed control section which detects a position of a rotor of the motor and a speed of the motor based on waveforms of the inductance calculated by the inductance calculating section to generate a speed control signal; and
a commutation control section which controls the inverter in response to the speed control signal.

23. The laser scanning unit of claim 22, wherein the motor drive circuit and the motor are connected by plural power supply lines.

24. The laser scanning unit of claim 23, wherein the inverter is a three-phase inverter having three terminals, three power supply lines connect the three terminals to the motor drive chip, and two current and voltage signal lines connect the inductance calculating section to two of the three power supply lines.

25. The laser scanning unit of claim 24, wherein the inductance calculating section detects current and voltage flowing through the three power supply lines $L_1$, $L_2$, and $L_3$ respectively.

26. The laser scanning unit of claim 25, wherein the voltage of the motor is
$V=L(\theta) \times dI/dt$, wherein $L(\theta)$ is inductance.

27. The laser scanning unit of claim 26, wherein the speed control section detects the position of the rotor from waveforms of the detected inductance to output a speed control signal to the commutation control section.

28. The laser scanning unit of claim 27, wherein the commutation control section controls the inverter in response to the speed control signal so as to cause the inverter to respectively supply current to the terminals of the motor in a switching order so as to rotate the rotor at a constant speed.

29. The laser scanning unit of claim 1, wherein the sensorless control algorithm uses a third harmonic voltage of a stator of the motor.

30. The laser scanning unit of claim 29, wherein the motor drive chip includes:
a motor starting section which generates a motor starting signal to start the motor;
an inverter which applies current to the motor in response to the motor starting signal;
a third harmonic voltage detecting section which detects a third harmonic voltage of the stator of the motor;
a speed control section which detects a position of a rotor of the motor and a speed of the motor based on waveforms of the third harmonic voltage detected by the third harmonic voltage detecting section to generate a speed control signal; and
a commutation control section which controls the inverter in response to the speed control signal.

31. The laser scanning unit of claim 30, wherein the motor drive circuit and the motor are connected by plural power supply lines.

32. The laser scanning unit of claim 31, wherein the inverter is a three-phase inverter having three terminals, three power supply lines connect the three terminals to the motor drive chip, and the third harmonic voltage detecting section is respectively connected to the three power supply lines by three voltage signal lines.

33. The laser scanning unit of claim 32, wherein, when the motor rotates, a third harmonic voltage of a stator of the motor has a position component, the third harmonic voltage detecting section detects a voltage of the stator of a Y-connection and sums up all the voltages, the sum having a third harmonic voltage component.

34. The laser scanning unit of claim 33, wherein the speed control section recognizes the position of the rotor using waveforms of the third harmonic voltage with the position component, and outputs a speed control signal to the commutation control section.

35. The laser scanning unit of claim 34, wherein the commutation control section controls the inverter in response to the speed control signal so as to cause the inverter to respectively supply current to the terminals of the motor in a switching order so as to rotate the rotor at a constant speed.

36. The laser scanning unit of claim 1, wherein the sensorless control algorithm uses an electromagnetic flux generated between the stator and the rotor of the motor.

37. The laser scanning unit of claim 36, wherein the motor drive chip includes:
a motor starting section which generates a motor starting signal to start the motor;
an inverter which applies current to the motor in response to the motor starting signal;
an electromagnetic flux calculating section which detects current and voltage supplied to the motor to calculate electromagnetic flux generated between the stator and the rotor of the motor;
a speed control section which detects a position of a rotor of the motor and a speed of the motor based on waveforms of the electromagnetic flux calculated by the electromagnetic flux calculating section to generate a speed control signal; and
a commutation control section which controls the inverter in response to the speed control signal.

38. The laser scanning unit of claim 37, wherein the motor drive circuit and the motor are connected by plural power supply lines.

39. The laser scanning unit of claim 38, wherein the inverter is a three-phase inverter having three terminals, three power supply lines connect the three terminals to the motor drive chip, and the electromagnetic flux calculating section is respectively connected to two of the three power supply lines by two current and voltage signal lines.

40. The laser scanning unit of claim 39, wherein, when electric power is respectively supplied to the terminals of the motor, electromagnetic flux is generated between the stator and the rotor, the electromagnetic flux being calculable by an indirect method using the current and voltage detected by the electromagnetic flux calculating section.

41. The laser scanning unit of claim 40, wherein the stator is a coil and the rotor is a magnet.

42. The laser scanning unit of claim 40, wherein the speed control section identifies the position of the rotor using waveforms of the calculated elctromagnetic flux, and outputs a speed control signal to the commutation control section.

43. The laser scanning unit of claim 42, wherein the commutation control section controls the inverter in response to the speed control signal so as to cause the inverter to respectively supply current to the terminals of the motor in a switching order so as to rotate the rotor at a constant speed.

44. A laser scanning unit comprising:

an optical system disposed in an enclosure and including an optical source which emits a laser beam, a mirror which scans the laser beam, and a plurality of optical elements which image the laser beam onto an image surface;

a motor disposed in the enclosure and which rotates the mirror; and a motor drive chip disposed outside of the enclosure and which uses a sensorless algorithm to control a rotation speed of the motor, wherein the motor drive chip is mounted on a main printed circuit board of a printing machine with which the laser scanning unit is used, the main printed circuit board being disposed remotely from the laser scanning unit.

45. A laser scanning unit comprising:

an enclosure enclosing an optical source which emits a laser beam, a mirror which scans the laser beam, a plurality of optical elements which image the laser beam on an image surface, and a motor disposed in the enclosure and which rotates the polygonal mirror; and a motor drive chip disposed outside of the enclosure and which controls a rotation speed of the motor, wherein the motor drive chip is mounted on a main printed circuit board of a printing machine with which the laser scanning unit is used, the main printed circuit board being disposed remotely from the laser scanning unit.

* * * * *

UNITED STATES PATENT AND TRADEMARK OFFICE
CERTIFICATE OF CORRECTION

PATENT NO. : 7,327,378 B2 Page 1 of 1
APPLICATION NO. : 10/750894
DATED : February 5, 2008
INVENTOR(S) : Suk-gyun Han et al.

It is certified that error appears in the above-identified patent and that said Letters Patent is hereby corrected as shown below:

Column 16, Line 59, change "elctromagnetic" to --electromagnetic--.

Signed and Sealed this

Twenty-sixth Day of August, 2008

JON W. DUDAS
*Director of the United States Patent and Trademark Office*